United States Patent [19]

Cline

[11] Patent Number: 5,394,977
[45] Date of Patent: Mar. 7, 1995

[54] APPARATUS AND METHOD FOR USE IN REPLACING CONVEYOR BELTS

[75] Inventor: Kenneth N. Cline, Canon City, Colo.

[73] Assignee: Portec, Inc., Canon City, Colo.

[21] Appl. No.: 88,791

[22] Filed: Jul. 8, 1993

[51] Int. Cl.⁶ .......................................... B65G 15/02
[52] U.S. Cl. .................................. 198/831; 198/842
[58] Field of Search ............. 198/819, 825, 826, 831, 198/840, 842

[56] References Cited

U.S. PATENT DOCUMENTS

| | | | |
|---|---|---|---|
| 3,327,839 | 6/1967 | Sigety et al. | 198/840 |
| 3,901,379 | 8/1975 | Bruhm | 198/831 |
| 4,024,949 | 5/1977 | Kleysteuber et al. | 198/831 |
| 4,955,466 | 9/1990 | Almes et al. | 198/831 |

FOREIGN PATENT DOCUMENTS 609235  9/1948  United Kingdom ................ 198/831

*Primary Examiner*—Joseph E. Valenza
*Attorney, Agent, or Firm*—Joseph J. Kelly

[57] ABSTRACT

Apparatus and method for facilitating the replacement of an endless conveyor belt having arcuate outer and inner edge portions. During the operation of the endless conveyor belt a plurality of cooperating pairs of guide rollers are in contact with shoulder portions of the endless conveyor belt adjacent to the arcuate outer edge portion to maintain the endless conveyor belt moving in a desired path. One of each cooperating pairs of rollers is mounted for movement between a first location whereat the cooperating pair of rollers are located to contact the shoulder portions and a second location whereat the cooperating pairs of rollers are spaced apart a distance permitting passage of the shoulder portions therebetween.

16 Claims, 1 Drawing Sheet

APPARATUS AND METHOD FOR USE IN REPLACING CONVEYOR BELTS

FIELD OF THE INVENTION

This invention is directed generally to power turns used to change the direction of movement of articles being moved from one location to another location and more particularly to apparatus and method for facilitating the replacement of the endless conveyor belt for a power turn.

BACKGROUND OF THE INVENTION

In Bruhm U.S. Pat. No. 3,901,379, which is incorporated by reference thereto, there is disclosed a power turn having an endless conveyor belt having a raised shoulder portion at its outer edge portion. A plurality of pairs of guide rollers are mounted to contact the raised shoulder portion to resist the radially inwardly directed forces on the endless conveyor belt and maintain the endless conveyor belt moving in a desired path. The rollers are mounted in a portion of a curved guidance frame. When it is necessary to replace an endless conveyor belt it is necessary to remove at least one of all of the pairs of rollers so that the endless conveyor belt can be removed. After the rollers have been removed, it is necessary to store them while the endless conveyor belt is being replaced. Thereafter, the rollers must be removed from storage and remounted on the portion of the curved guidance frame. Therefore, is desirable to provide a method and apparatus to facilitate the replacement of endless conveyor belts in such power turns.

BRIEF DESCRIPTION OF THE INVENTION

This invention provides apparatus and method for facilitating the replacement of an endless conveyor belt, particularly for a power turn, wherein one roller of each of a plurality of cooperating pairs of rollers is mounted for movement toward or away from the other roller to permit or prevent passage of a raised portion adjacent to the outer edge portion of the endless conveyor belt between the cooperating pair of rollers.

In a preferred embodiment of the invention, apparatus is provided for mounting guide means for guiding the movement of an endless conveyor belt having arcuate outer and inner edge portions to facilitate the replacement of the endless conveyor belt. The guide means contact a raised portion adjacent to the arcuate outer edge portion of the endless conveyor belt during the operation thereof to maintain the endless conveyor belt moving in a desired path. A plurality of bearing standoffs are fixedly mounted at spaced apart locations in an arcuate path concentric with the arcuate outer edge. At least one support, preferably an angle bracket, is mounted on the plurality of bearing standoffs and at least a pair of guide means, preferably rollers, are mounted on the supports and each of the guide means has a surface for contacting the radially inner side of the raised portion on the endless conveyor belt. Mounting means are provided for mounting the at least a pair of guide means so that at least one of the at least a pair of guide means can be moved between a first location whereat the raised portion cannot pass between the at least a pair of guide means and a second location whereat the raised portion can pass between the at least a pair of guide means.

The mounting means include pivot means for permitting pivotal movement of the at least one support relative to the at least one of the plurality of bearing standoffs around a pivotal axis so that the at least one support moves between one location at which the at least one of the guide means can be moved in radial directions toward or away from the pivotal axis and another location at which the at least one of the guide means cannot be moved in radial directions toward or away from the pivotal axis. The means for permitting the movement of the at least one of the pair of guide means include at least one slot formed in the at least one of the plurality of bearing standoffs and at least one slot in the at least one support located to be moved into alignment with the at least one slot in the at least one of the plurality of bearing standoffs and to permit the movement of said at least one of said guide means in radial directions toward or away from the pivotal axis include an arcuately shaped extension of the at least one slot in the at least one support and located to be moved into or out of alignment with the at least one slot in the at least one of the plurality of bearing standoffs. The means for permitting or preventing the movement of the at least one of the pair of guide means further include a first headed threaded bolt passing through an opening in the at least one of the plurality of bearing standoffs and in threaded engagement with a threaded opening in the at least one bracket to provide the pivotal axis and permit or prevent the pivotal movement; a second headed threaded bolt passing through the at least one slot in the at least one of the plurality of bearing standoffs and through the arcuately shaped extension or the at least one slot in the at least one bracket and a nut in threaded engagement with the second headed threaded bolt to permit or prevent the pivotal movement of the at least one bracket or the movement of the at least one of the guide means in radial directions toward or away from the pivotal axis.

An arcuate support concentric with the outer edge portion is mounted at a relatively fixed location and the plurality of bearing standoffs are mounted at circumferentially spaced apart locations on the arcuate support. Each of the plurality of bearing standoffs has an upper portion and a lower portion. At least one of the angle brackets is mounted on each of the upper and lower portions of at least some of the plurality of bearing standoffs. Each of the plurality of bearing standoffs has a central body portion secured to the arcuate support. The upper portion projects upwardly from the central body portion and is inclined relative thereto. The lower portion projects downwardly from the central body portion and is inclined relative thereto.

When it is necessary to replace an endless conveyor belt, the power is turned off so that the endless conveyor belt will stop. Each of the first and second headed threaded bolts are successively loosened, the brackets are pivoted to move the slot in the angle bracket into alignment with the slot in the bearing standoff, the one guide roller is moved to the other end of the slot in the bearing standoff and the second headed threaded bolt is tightened to hold the one guide roller in the moved location. The endless conveyor belt is moved out and the new endless conveyor belt is moved in. The second headed threaded bolt is loosened and moved along the aligned slots, the angle bracket is pivoted back to move the second headed threaded bolt back into the arcuate extension and the first and second headed threaded bolts are tightened.

BRIEF DESCRIPTION OF THE DRAWING

An illustrative and presently preferred embodiment of the invention is shown in the accompanying drawing in which.

DETAILED DESCRIPTION OF THE INVENTION

Figure 1:
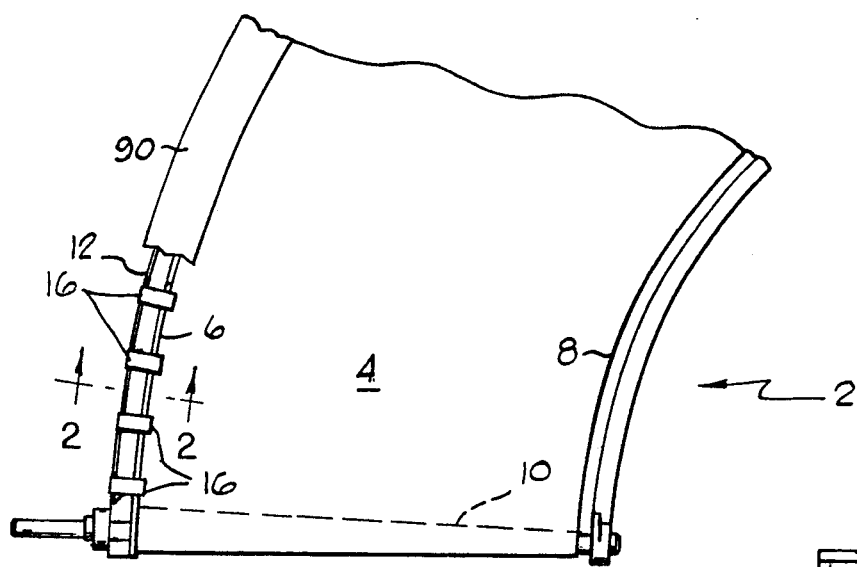
FIG. 1 is a schematic top plan view of a portion of a power turn.

In FIG. 1, there is illustrated a power turn 2 comprising an endless conveyor belt 4 having an arcuate outer edge portion 6 and an arcuate inner edge portion 8. The endless conveyor belt 4 is mounted around conical rolls 10, only one shown, mounted on a frame 12. A portion of the frame 12 includes an arcuate support 14, in FIG. 2. A plurality of bearing standoffs 16 are mounted at circumferentially spaced apart locations on the arcuate support 14 using headed threaded bolts 18 threaded into threaded openings (not shown) in the arcuate support 14. Each bearing standoff 16 has a central body portion 20, an upper portion 22 which projects upwardly from the central body portion 20 and is inclined relative thereto and a lower portion 24 which projects downwardly from the central body portion 20 and is inclined relative thereto. Each of the upper and lower portions has an opening 26 and a slot 28 formed therein, FIG. 3, for purposes described below.

Figure 4:
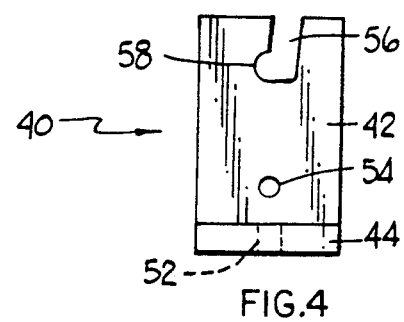
FIG. 4 is a front elevational view of an angle bracket of this invention.

An angle bracket 40, FIG. 4, is mounted on each of the upper and lower portions 22 and 24. The angle bracket 40 has a first portion 42 and a second portion 44 having a 90 degree relationship. A roller bearing 46 having a cylindrical surface 48 is mounted on each second portion 44 using a headed threaded bolt 50 threaded into a threaded opening 52 in the second portion 44. The first portion 42 has a threaded opening 54 and a slot 56 having an off-set arcuate opening 58 formed therein.

The first portion 42 is pivotally mounted on each of the upper and lower portions 22 and 24 using a headed threaded bolt 60 passing through the opening 26 and threaded into the threaded opening 54. A roller bearing 62 having a cylindrical surface 64 is mounted on the first portion 42 using a headed threaded bolt 66 passing through the slot 28 and the arcuate opening 58, and the roller bearing 62 is secured where desired by the threaded nut 68.

Figure 2:
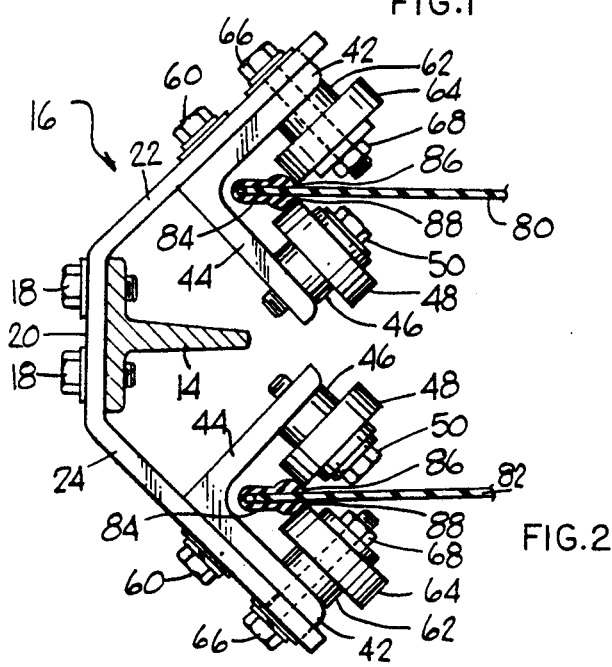
FIG. 2 is a cross-sectional view taken on the line 2—2 of FIG. 1.
Figure 3:
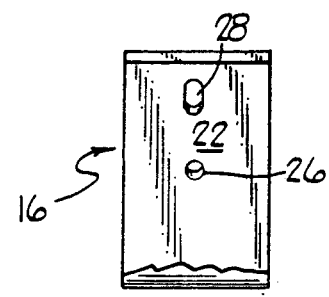
FIG. 3 is a front elevational view of a portion of a bearing standoff of this invention.

The location of the various parts during the operation of the endless conveyor belt 4 is illustrated in FIG. 2. The endless conveyor belt 4 has an upper run 80 and a lower run 82. A U-shaped member 84 is secured to the outer edge portion 6 using suitable means, such as an adhesive or rivets, and provides shoulder portions 86 and 88 which are contacted by the cylindrical surfaces 48 and 64. The operation of the endless conveyor belt 4 produces a radially inwardly directed force but the cylindrical surfaces 48 and 64 bear against the shoulders 86 and 88 to keep the endless conveyor belt 4 moving in the desired path.

Figure 5:
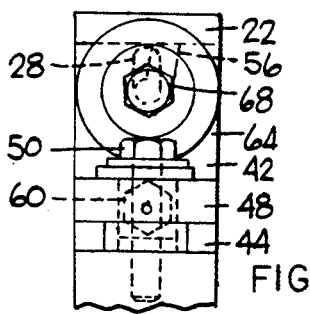
FIGS. 5-7 illustrate the operation of this invention.
Figure 6:
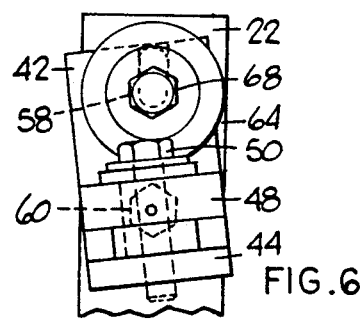
Figure 7:
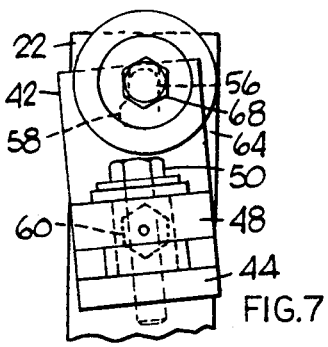

When it is desired to replace the endless conveyor belt 4, the power is turned off so that the endless conveyor belt 4 stops running. The cover 90, FIG. 1, is removed. The bolts 60 and 68 are loosened, FIG. 5, to permit the first portion 42 to pivot relative to the upper and lower portions 22 and 24. The first portions 42 are pivoted until the slot 56 is aligned with the slot 28 as in FIG. 6. The headed threaded bolt 66 is then moved upwardly along the aligned slots 28 and 56 in the upper portion 22 and downwardly along the aligned slots 28 and 56 in the lower portion 24 and then tightened. This moves the cylindrical surfaces 64 away from the cylindrical surfaces 48, FIG. 7, to provide sufficient clearance for the shoulder portions 86 and 88 to pass therebetween. The old endless conveyor belt 4 is then removed and a new endless conveyor belt 4 is passed between the cylindrical surfaces 48 and 64. The headed threaded bolts 66 are loosened and moved back along the aligned slots 28 and 56 and the first portions 42 are pivoted back until the headed threaded bolts 66 are in the arcuate openings 58. The headed threaded bolts 60 and 66 are tightened so that the shoulder portions 86 and 88 abut against the cylindrical surfaces 48 and 64.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. Apparatus for mounting guide means for guiding the movement of an endless conveyor belt having arcuate outer and inner edge portions to facilitate the replacement of the endless conveyor belt wherein the guide means contact shoulder portions adjacent to the arcuate outer edge portion of the endless conveyor belt during the operation thereof to maintain the endless conveyor belt moving in a desired path comprising:

a plurality of bearing standoffs fixedly mounted at spaced apart locations;

at least one support mounted on at least some of said plurality of bearing standoffs;

at least a pair of guide means mounted on said supports;

each of said guide means having a surface for contacting the radially inner side of shoulder portions on said endless conveyor belt;

mounting means for mounting said at least one support so that said at least one support can be moved relative to at least one of said plurality of bearing standoffs between a first location whereat at least one of said at least a pair of guide means cannot be moved relative to said at least one support and said at least one of said plurality of bearing standoffs to permit said shoulder portions to pass between said at least a pair of guide means and a second location whereat said at least one of said at least a pair of guide means can be moved relative to said at least one support and said at least one of said plurality of bearing standoffs so that said shoulder portions can pass between said at least a pair of guide means and wherein said mounting means comprise:

pivot means for permitting pivotal movement of said at least one support relative to said at least one of said plurality of bearing standoffs around a pivotal axis so that said at least one support moves between said first location at which said at least one of said pair of guide means cannot be moved in radial directions toward or away from said pivotal axis and said second location at which said at least one of said pair of guide means can be moved in radial directions toward or away from said pivotal axis.

2. Apparatus as in claim 1 and further comprising:
at least one slot formed in said at least one of said plurality of bearing standoffs;
at least one slot in said at least one support located to move with said at least one support into alignment with said at least one slot in said at least one of said plurality of bearing standoffs to permit said movement of said at least one of said pair of guide means in radial directions toward or away from said pivotal axis; and
an arcuately shaped extension of said at least one slot in said at least one support and located to move with said at least one support into alignment with said at least one slot in said at least one of said plurality of bearing standoffs to prevent movement of said at least one of said pair of guide means in radial directions.

3. Apparatus as in claim 2 and further comprising:
a first headed threaded bolt passing through an opening in said at least one of said plurality of bearing standoffs and in threaded engagement with a threaded opening in said at least one support to provide said pivotal axis and permit or prevent said pivotal movement;
a second headed threaded bolt passing through said at least one slot in said at least one of said plurality of bearing standoffs and through said arcuately shaped extension or said at least one slot in said at least one support and through said at least one of said pair of guide means; and
a nut in threaded engagement with and end portion of said second headed threaded bolt to permit or prevent said pivotal movement of said at least one bracket or said movement of said at least one of said pair of guide means in radial directions toward or away from said pivotal axis.

4. Apparatus as in claim 3 wherein:
the other of said pair of guide means being mounted for rotation at a fixed location on said at least one support.

5. Apparatus as in claim 1 and further comprising;
an arcuate support mounted at a relatively fixed location; and
said plurality of bearing standoffs mounted at circumferentially spaced apart locations on said arcuate support.

6. Apparatus as in claim 6 wherein:
said arcuate support being concentric with said arcuate outer edge portion.

7. Apparatus as in claim 1 and further comprising:
each of said plurality of bearing standoffs having an upper portion and a lower portion;
at least one of said supports mounted on each of said upper and lower portions of said at least some of said plurality of bearing standoffs.

8. Apparatus as in claim 7 said mounting means comprise:
pivot means for permitting pivotal movement of said at least one support relative to said at least one of said plurality of bearing standoffs around a pivotal axis so that said at least one support between one location at which said at least one of said pair of guide means can be moved in radial directions toward or away from said pivotal axis and another location at which said at least one of said pair guide means cannot be moved in radial directions toward or away from said pivotal axis.

9. Apparatus as in claim 8 and further comprising:
at least one slot formed in said at least one of said plurality of bearing standoffs;
at least one slot in said at least one support located to move with said at least one support into of alignment with said at least one slot in said at least one of said plurality of bearing standoffs to permit said movement of said at least one of said pair of guide means in radial directions toward or away from said pivotal axis; and
an arcuately shaped extension of said at least one slot in said at least one support and located to move with said at least one support into alignment with said at least one slot in said at least one of said plurality of bearing standoffs to prevent movement of said one of said pair of guide means in radial directions.

10. Apparatus as in claim 9 and further comprising:
an arcuate support mounted at a relatively fixed location; and
said plurality of bearing standoffs mounted at circumferentially spaced apart locations on said arcuate support.

11. Apparatus as in claim 9 wherein each of said plurality of bearing standoffs comprises:
a central body portion secured to said arcuate support;
said upper portion projecting upwardly from said central body portion and being inclined relative thereto; and
said lower portion projecting downwardly from said central body portion and being inclined relative thereto.

12. Apparatus as in claim 11 and further comprising:
a first headed threaded bolt passing through an opening in said at least one of said plurality of bearing standoffs and in threaded engagement with a threaded opening in said at least one support to provide said pivotal axis and permit or prevent said pivotal movement;
a second headed threaded bolt passing through said at least one slot in said at least one of said plurality of bearing standoffs and through said arcuately shaped extensions or said at least one slot in said at least one support and through at least one of said pair of guide means; and
a nut in threaded engagement with an end portion of said second headed threaded bolt to permit or prevent said pivotal movement of said at least one bracket or said movement of said at least one of said pair of guide means in radial directions toward or away from said pivotal axis.

13. Apparatus as in claim 12 wherein:
the other of said pair of guide means being mounted for rotation at a fixed location on said at least one bracket.

14. Apparatus as in claim 9 wherein:
said arcuate support being concentric with said arcuate outer edge portion.

15. Apparatus as in claim 1 wherein said at least one support comprises:
an angle bracket.

16. Apparatus as in claim 1 wherein said at least a pair of guide means comprises:
a pair of guide rollers.

* * * * *